United States Patent Office 3,641,044
Patented Feb. 8, 1972

3,641,044
PROCESS FOR THE MANUFACTURE OF
ARYLOXAZOLES
Erich Matter, Basel, Switzerland, assignor to Ciba
Limited, Basel, Switzerland
No Drawing. Filed Aug. 20, 1968, Ser. No. 753,893
Claims priority, application Switzerland, Aug. 25, 1967,
11,936/67
Int. Cl. C07d 85/48
U.S. Cl. 260—307 D                                     6 Claims

ABSTRACT OF THE DISCLOSURE

A process for the manufacture of aryloxazoles, starting from ortho-hydroxyaminoaryl compounds and carboxylic acids. The reaction is carried out at elevated temperatures in a diluent, and a tertiary nitrogenous base is initially added to the mixture containing the ortho-hydroxyaminoaryl compound.

---

It is known that aryloxazoles, that is to say oxazoles whose two vicinal carbon atoms of the oxazole ring are at the same time cyclic members of an aromaticcarboxylic 6-membered ring, are advantageously manufactured from ortho-hydroxyaminoaryl compounds and carboxylic acids. In this process a total of 2 molecules of water are eliminated from each ortho-hydroxyamino group and carboxylic acid group, for example in the simplest case thus:

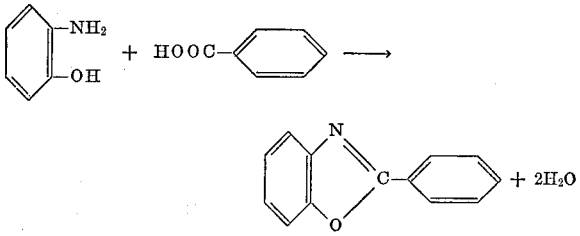

It has now been found that aryloxazoles can be manufactured by this route in a particularly advantageous manner when a tertiary nitrogen base is reacted in a diluent that is inert towards the reactants with an aliphatic dicarboxylic acid containing at least 4 carbon atoms or preferably with a mono- or dicarboxylic acid containing 1 or 2 carbocycles or heterocycles each containing 5 or 6 cyclic members, then in this mixture at a temperature from 150 to 210° C. the reaction with a hydroxyaminoaryl compound containing the hydroxyl an damino groups in vicinal positions is carried out and then the reaction is finalized at a temperature of at least 200° C. In general, the reaction is finalized within the temperature range from 200 to 260° C., preferably from 200 to 240° C.

When aliphatic carboxylic acids are used as starting materials in this process, they contain two carboxylic acid groups and at least 4 carbon atoms. The bridge member between the two carboxylic acid groups may be a linear or branched, unsaturated or saturated aliphatic hydrocarbon residue. This residue may be substituted, for example by halogen atoms such as chlorine, amino groups, alkoxy groups such as methoxy or especially by hydroxyl groups. As examples of aliphatic dicarboxylic acids there may be mentioned adipic, dichlorosuccinic, tartaric, aspartic, thiomalic acid and especially succinic, fumaric and malic acid. It should be borne in mind that in certain circumstances during the performance of the present process changes may occur also in the bridge member between the two carboxylic acid groups, for example elimination of another molecule of water from tartaric or malic acid or of ammonia from aspartic acid, whereby carbon-to-carbon double bonds are formed.

The process of this invention is of special value to the reaction of cyclic-aromatic carboxylic acids. In such a case the ring systems may contain one or two carboxylic acid groups and two or preferably one carbocycle or heterocycle. Carbocycles are aromatic, as is the case with naphthalene-, diphenyl- and benzene-mono- and dicarboxylic acids. Heterocycles preferably contain 5 cyclic members, namely 4 carbon atoms and one oxygen or sulphur atom. Thus, monocyclic benzene-, furan- or thiophene-carboxylic acids are especially useful. The heterocycles, and especially the aromatic carbocycles, may contain apart from the carboxylic acid groups further substituents, for example halogen such as bromine or chlorine atoms, alkyl, alkyl groups containing 1 to 4 carbon atoms such as methyl, ethyl, isopropyl, tertiary butyl, also alkoxy groups with 1 or 2 carbon atoms.

According to a preferred variant of the present process (1)(a) a carboxylic acid, containing 1 or 2 carboxyl groups, of benzene, diphenyl, naphthalene, stilbene, styrene, thiophene or furan, or an analogue of these carboxylic acids with 1 to 3 alkyl groups containing 1 to 4 carbon atoms each, and
  (b) a saturated tertiary nitrogen base from the group of the tertiary aminobenzenes, of pyridine and its alkyl derivatives, or of saturated aliphatic amines representing alkyl derivatives of ammonia, are reacted in the presence of
  (c) a diluent which may be the nitrogen base defined above or a halobenzene, alkylbenzene, partially hydrogenated naphthalene, a diphenyl ether or diphenyl or a mixture thereof, which boils at 200° C. or over and is liquid at room temperature,
(2)(a) and this reaction mixture, together with approximately the equivalent quantity (referred to the carboxyl groups) of an ortho-hydroxyaminobenzene which may be substituted by 1 to 3 alkyl groups containing 1–4 carbon atoms or by a phenyl group, and
  (b) a catalytic proportion of boric acid is heated to a temperature from 150 to 210° C., and
(3) the reaction is finalized by heating to a temperature from 200 to 260° C.

a variant which is particularly valuable to industry is characterized in that (1)(a) a dicarboxylic acid of benzene, diphenyl, naphthalene, stilbene, thiophene or furan is reacted with
  (b) 0.1 to 1 mol equivalent of pyridine for every carboxylic acid equivalent in
  (c) a trichlorobenzene as diluent and
(2) this reaction mixture together with
  (a) approximately an equivalent quantity of an ortho-hydroxyaminobenzene which may be substituted by an alkyl group containing 1–4 carbon atoms, and
  (b) 0.5 to 10% by weight of boric acid, is heated to a temperature from 150 to 210° C., and
(3) the reaction is finalized by heating to 200 to 240° C.

As examples of aromatic-cyclic carboxylic acids suitable for use as starting materials the following may be mentioned:

naphthalene-1- or -2-carboxylic acid,
naphthalene-1,4- or -1,5-dicarboxylic acid,
diphenyl-4,4'-dicarboxylic acid,
stilbene-4,4'-dicarboxylic acid,
cinnamic acid,
benzenecarboxylic acid,
3- or preferably 4-methylbenzenecarboxylic acid,
benzene-1,3- or preferably -1,4-dicarboxylic acid,
furan-2-carboxylic acid,
thiophene-2-carboxylic acid, 3,4-dimethylthiophene-2,5-dicarboxylic acid,
3,4-diphenylthiophene-2,5-dicarboxylic acid,
diphenyl-4-carboxylic acid,
5-phenylthiophene-2-carboxylic acid and
furan-2,5-dicarboxylic acid.

Particularly valuable results are obtained with the dicarboxylic acids of the formula (1) 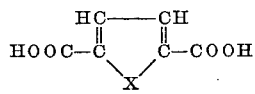

in which X represents an oxygen or a sulphur atom, that is to say with furan- and thiophene-2,5-dicarboxylic acid. As is known the bisoxazoles obtainable from these dicarboxylic acids especially from thiophenedicarboxylic acid, and furthermore from further substituted ortho-hydroxyaminobenzenes, are valuable optical brighteners.

As further starting materials for the present process there are required hydroxyaminoaryl compounds that contain the hydroxyl group and the (primary) amino group in vicinal positions to each other. There may be used, for example, 1,2- or 2,1-hydroxyaminonaphthalenes or preferably ortho-hydroxyaminobenzenes containing further substituents, for example a halogen such as chlorine atom, an alkoxy group such as methoxy or ethoxy, a phenyl group, an alkyl group such as methyl, ethyl, isopropyl, tertiary butyl or 1,1,3,3-tetramethylbutyl, or two methyl groups. Preferred use is made of ortho-hydroxyaminobenzene that contains no further substituents, and of ortho-hydroxyaminobenzenes containing as further substituent(s) one or two alkyl groups, an alkoxy group, a halogen atom or a phenyl group. In this connection there should be specially mentioned the ortho-hydroxyaminobenzenes of the formula (2) 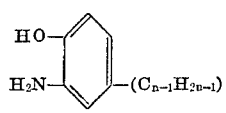

in which $n$ is a digit from 1 to 9.

The reactions of the present process are carried out in a diluent which must as such be liquid at the temperatures prevailing during the whole of the process and must not participate in the reaction. However, it is by no means necessary for all products involved in the reaction, that is to say the reactants used as starting materials, the intermediates and final products, to be substantially or completely dissolved. More especially, the carboxylic acid amides generally formed as intermediates may be sparingly soluble to practically insoluble in such a diluent without causing any trouble. Since the diluent must be present also at the high temperature prevailing at the end of the reaction, it is advisable to use as diluent for the reaction medium an inert organic solvent that has under atmospheric pressure a boiling point of at least 200° C. While it is feasible to use at the start of the reactions a diluent or solvent boiling at a lower temperature, allowing it to distill off and replacing it timely by a higher-boiling one, for which purpose even water may be used as a first diluent, it is more advantageous if only for economic reasons to use from the start a high-boiling diluent that need not be replaced or replenished. Examples of specially suitable solvents are tetrahydronaphthalene, mixtures of diphenyl and diphenyl ether, and especially trichlorobenzenes or commercial trichlorobenzene mixtures.

As a further assistant a tertiary nitrogen base is used in the present process. This base may be, for example, a tertiary amine such as dimethylaniline, diethylaniline or trimethylamine. Likewise very suitable are pyridine bases such as quinoline, picolines and preferably pyridine itself, and either pyridine bases as such or mixtures thereof may be used.

To ensure a smooth and complete reaction according to this invention it is advisable to add a dehydrating catalyst such as toluenesulphonic acid or preferably boric acid, at least during the final stage of the process performed above 200° C., in general at 200 to 260° C. or preferably from 200 to 240° C.

Of the two starting materials, from which the oxazoles result by elimination of water, it is advantageous to use equivalent amounts, that is to say 1 mol of mono-carboxylic acid for every mol of hydroxyaminoaryl compound and 1 mol of dicarboxylic acid for every 2 mols of hydroxyaminoaryl compound, or at most 5 mol-percent more or less than these amounts. The proportion of the diluent should be chosen so that even when insoluble products materialize, especially the carboxylic acid amides formed as intermediates, the reaction mixture can be easily kept homogeneous with a stirrer of the usual type. Depending on the starting materials chosen the particularly favourable proportion of diluent may vary. In general, good results are obtained by using about half to twice the amount of diluent referred to the weight of the two starting materials. Even as little as 0.2 equivalent of tertiary base for every carboxylic acid equivalent produces relatively good results which can be substantially improved by raising the amount to the mono-equivalent quantity, that is to say, for example, 2 mols of pyridine for every mol of dicarboxylic acid. An excess over and above this quantity can certainly be used, but as a rule it does not produce any improvement. The dehydrating catalyst is used in the usual quantity, for example 0.5 to 10% of boric acid referred to the carboxylic acid.

An essential feature of the present process is that at first the tertiary base and the carboxylic acid should react upon each other. Therefore, for example, the base and the carboxylic acid may be stirred first in the diluent, then the hydroxyaminoaryl compound and the dehydrating catalyst are added and the whole is then slowly heated further until first the acid amide is formed and then at an even higher temperature cyclization occurs.

According to a simpler and particularly advantageous method a mixture, which has been prepared by combining a tertiary nitrogen base with a carboxylic acid of the composition defined above and a hydroxyaminoaryl compound of the composition defined above in a liquid diluent, is first heated to a temperature from 150 to 210° C. until about one molecule of water per molecule of hydroxyaminoaryl compound has been eliminated, whereupon the reaction is finalized by heating to a higher temperature but not exceeding 240° C., during which the water is continuously distilled off.

In general, the distillation of the water entrains also the tertiary base which is liberated during the reaction with the hydroxyamino compound. However, when a tertiary base having a high boiling point (for example diethylaniline) is used, an excess of this base may be used to serve at the same time as diluent. To prevent undesirable oxidations it is advisable to prevent any contact between the reaction medium and oxygen, that is to say to work with exclusion of air, advantageously under nitrogen. As will be realized from the foregoing, the carboxylic acid amide is formed in the first and the oxazole in the second stage of the present process. The minimal temperature at which the second stage is performed may vary from case to case within the limits shown. It is advantageous to separate the two stages from each other as far as possible, that is to say not to heat the mixture to the cyclization temperature before most of the carboxylic acid amide has formed.

The present process yields the oxazoles in very good yields and purity.

EXAMPLE 1

2,5-di-[benzoxazolyl-(2′)]-thiophene

A mixture of 500 g. of trichlorobenzene (mixture of its isomers), 219 g. of 1-hydroxy-2-aminobenzene, 172 g. of 2,5-thiophenedicarboxylic acid, 5 g. of boric acid and 158 g. of pyridine is stirred in the reactor with exclusion of air. The beige-coloured suspension is heated within 4 hours to 210° C., during which the colour changes to yellow and a mixture of pyridine and water begins to pass over at 160° C.

The reaction mixture turns temporarily thinner and at 180° C. it is transformed into the thick, yellow crystal magma of the diamide. The temperature is raised from 210 to 220° C. within another 2 hours and the batch is finally stirred for 2–3 hours at 220° C. The yellow crystals dissolve and form a brown solution of the oxazole. Total yield: 260 cc. of distillate, with some trichlorobenzene simultaneously passing over above 180° C. At 150° C. the reaction product begins to crystallize out. 400 grams of isopropanol are then cautiously run in and the whole is cooled to room temperature. The yellow crystals are suctioned off, washed with isopropanol and dried at 80–90° C. under vacuum.

Yield: 305 to 310 g. of yellow 2,5-di-[benzoxazolyl-(2')]-thiophene, corresponding to 96–97% of the theoretical yield. Melting point: 222° C.

To purify the product it is dissolved in 6 times its own weight of trichlorobenzene, at 150° C. treated with an adsorbent, clarified by filtration and evaporated. On addition of isopropanol the pale-yellow crystals melting at about 223° C. are completely precipitated.

When instead of thiophenedicarboxylic acid an equivalent quantity of naphthalene-1,4-dicarboxylic acid is used, a yield of 91% of the oxazole of the formula (3)

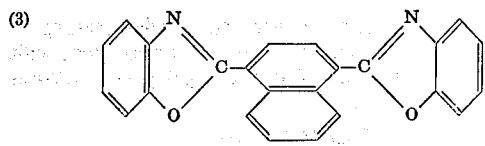

is obtained in form of pale-yellow felted needles melting at 215–217° C.

EXAMPLE 2

2,5-di-[5'-tertiary butyl-benzoxazolyl-(2')]-thiophene

The reactor is charged with 250 g. of trichlorobenzene, 266 g. of 1-hydroxy-2-amino-4-tretiary butylbenzene, 138 g. of 2,5-thiophenedicarboxylic acid, 5 g. of boric acid and 126 g. of pyridine and the air is then displaced from it with nitrogen. While stirring the batch under nitrogen, it is heated within 2 hours to 150° C. Above 60° C. the reaction mixture becomes appreciably thinner and forms a clear solution at 130° C.

Within a further 2 hours the batch is heated to 210° C. In this phase the diamide is formed, a mixture of pyridine and water passing over and a yellow crystal magma being formed.

Within a further hour the batch is heated to 218° C. and it is finally stirred for 3 hours at 218 to 220° C., during which the crystal magma is transformed into a clear brown solution. In all 200 cc. of distillate are collected. On completion of the reaction 250 g. of isopropanol are cautiously added at 130° C. The oxazole is obtained in form of yellow crystals.

The batch is cooled to 10–15° C. and suctioned on a porcelain suction filter, rinsed with isopropanol and dried at 80–90° C. under vacuum.

The product is obtained in form of pale-yellow crystals. Yield: 328 to 330 g., equal to 95–96% of the theoretical yield. Melting point: 201–202° C.

EXAMPLE 3

2,5-di-[benzoxazolyl-(2')]-furan

A mixture of 219 g. of 1-hydroxy-2-aminobenzene, 156 g. of 2,5-furandicarboxylic acid, 5 g. of boric acid, 500 g. of trichlorobenzene and 158 g. of pyridine is heated with exclusion of air within 4 hours to 200° C., during which a pyridine+water mixture begins to pass over above 150° C. The thick crystal magma of the diamide is formed at 180° C.

The temperature is raised within 2 hours to 220° C. and the batch is stirred for 3 hours at 220° C. On completion of the reaction a clear, brown solution has formed.

400 grams of isopropanol are cautiously run in at 160° C., whereupon the oxazole settles out in form of yellow crystals which, after cooling, are suctioned off, rinsed with isopropanol and dried under vacuum.

Yield: 294 g. of 2,5-di[benzoxazolyl-(2')]-furan, corresponding to 97.3% of the theoretical yield. Melting point: 246–247° C.

EXAMPLE 4

2-(4'-methylphenyl)-5-tertiary butyl-benzoxazole

A mixture of 50 g. of trichlorobenzene, 272 g. of 4-methylbenzene-1-carboxylic acid, 330 g. of 1-hydroxy-2-amino-4-tertiary butylbenzene, 10 g. of boric acid and 158 g. of pyridine is stirred with complete exclusion of air and heated within 4 hours to 210° C. A mixture of pyridine and water begins to pass over at 150° C.

The temperature is raised within 1 hour to 220° C. and the batch is finally stirred for 2 hours at 220–230° C. A total of 237 cc. of distillate is collected, and at the end of the reaction the batch forms a brown solution which is cooled to 110° C. and 200 g. of isopropanol are cautiously run in. The batch is cooled to 5° C., suctioned and the filter residue is rinsed with cold isopropanol.

The pale faintly reddish crystals are dried at 80° C. in a vacuum drying cabinet.

Yield: 500.5 g. of the product, corresponding to 94.3% of the theoretical. Melting point: 114° C.

EXAMPLE 5

2,5-di-[benzoxazolyl-(2')]-thiophene

The procedure is as described in Example 1, except that 186 g. of α-picoline are used instead of 158 g. of pyridine, to yield 2,5-di[benzoxazolyl-(2')]-thiophene in a yield of 96% of theory.

EXAMPLE 6

2,5-di-[benzoxazolyl-(2')]-thiophene

A mixture of 500 g. of tetrahydronaphthalene, 219 g. of 1-hydroxy-2-aminobenzene, 172 g. of 2,5-thiophenedicarboxylic acid, 5 g. of boric aicd and 158 g. of pyridine is stirred under exclusion of air according to Example 1 and heated within 6 hours to 220° C. and then stirred on for 3 hours at this temperature. To prevent the reaction mixture from getting too thick the solvent distilled off may, if necessary, be replenished. A total of 563 cc. of distillate is collected.

At about 160° C. the product begins to settle out and 400 g. of isopropanol are cautiously run in.

2,5-di-[benzoxazolyl-(2')]-thiophene is obtained in a yield of 89% of the theoretical in form of yellow, brownish crystals. Meling point: 220–220.5° C.

EXAMPLE 7

4,4'-di[5"-tertiary butyl-benzoxazolyl-(2")]-stilbene

A mixture of 134.1 g. of powdered stilbenedicarboxylic acid, 165.2 g. of 2-amino-4-tertiary butylphenol, 5 g. of boric acid, 400 g. of trichlorobenzene and 79 g. of pyridine is stirred with exclusion of air and within 4 hours heated to 210° C. during which a mixture of water and pyridine passes over. The thin, yellowish brown suspension is heated within 1 hour to 220° C. and then stirred for 3 hours at 220° C. 400 grams of isopropanol are run in at 150° C., and the batch is cooled to room temperature, suctioned, washed with isopropanol and dried in a vacuum drying cabinet.

Yield: 196.5 g. of yellow crystals melting at 260° C.

EXAMPLE 8

1,4-di[benzoxazolyl-(2')]-benzene

A mixture of 166.1 g. of terephthalic acid, 219 g. of 2- aminophenol, 300 g. of trichlorobenzene, 5 g. of boric acid and 158 g. of pyridine is stirred with exclusion of air and within 4 hours heated to 210° C. A dark-brown magma forms while a mixture of water and pyridine passes over. The temperature is raised to 220° C. within 1 hour and the batch is finally stirred for 3 hours at 220° C. 400 grams of isopropanol are run in at 150° C., the batch is cooled to room temperature, suctioned, and the crystals are washed with isopropanol and finally dried.

1,4-di[benzoxazolyl-(2′)]-benzene is obtained in yellow crystals in a yield of 90% of the theoretical.

EXAMPLE 9

2,5-di-[benzoxazolyl-(2′)]-thiophene

A mixture of 153 g. of 2-aminophenol, 120.8 g. of 2,5-thiophenedicarboxylic acid, 3 g. of boric acid and 350 g. of N,N′-diethylaniline is heated with exclusion of air within 4 hours to 210° C., during which a mixture of water and some diethylaniline passes over. The temperature is raised to 220° C. within 1 hour and the batch is finally stirred for 3 hours at 220° C., to form a yellow-brown solution. 250 grams of xylene are run in at 200° C., and the whole is cooled to room temperature.

2,5-di[benzoxazolyl-(2′)]-thiophene, melting at 222° C., is obtained in form of yellow crystals in a yield of 89.5% of theory.

EXAMPLE 10

2,5-di-[benzoxazolyl-(2′)]-thiophene

A mixture of 219 g. of 2-aminophenol, 172 g. of 2,5-thiophenedicarboxylic acid, 5 g. of boric acid, 500 g. of trichlorobenzene and 101 g. of triethylamine is heated within 4 hours at 210° C. with exclusion of atmospheric oxygen. A yellow-brown solution is formed and a mixture of water+triethylamine passes over. The temperature is raised to 220° C. within 1 hour and the batch is stirred for 3 hours at 220° C. 400 grams of isopropanol are cautiously run in at 150° C. The batch is cooled to room temperature, suctioned and rinsed with isopropanol.

2,5-di[benzoxazolyl-(2′)]-thiophene, melting at 221° C., is obtained in form of yellow crystals in a yield of 95.5% of theory.

EXAMPLE 11

4-[benzoxalyl-(2′)]-diphenyl

A mixture of 205.4 g. of diphenyl-4-carboxylic acid, 109 g. of 2-aminophenol, 5 g. of boric acid, 700 g. of trichlorobenzene and 79 g. of pyridine is heated within 4 hours to 210° C. while excluding atmospheric oxygen, then heated within a further hour to 220° C. and stirred for 3 hours at 220° C. 400 grams of isopropanol are cautiously added at 150° C. to the brown solution which is then cooled to room temperature, suctioned, washed with isopropanol and dried.

Yield: 230.8 g. of yellow crystals melting at 139.5° C.

EXAMPLE 12

2,5-di-[benzoxazolyl-(2′)]-thiophene

A mixture of 220 g. of ortho-aminophenol, 172 g. of thiophene-dicarboxylic acid, 6 g. of boric acid, 600 g. of trichlorobenzene and 3 g. of quinoline is heated with exclusion of atmospheric oxygen in a moderate current of nitrogen within 2 hours to 180° C. and within a further 2 hours to 220° C. The reaction mixture is then stirred for 3 hours at 220–222° C.

When the temperature has dropped to 140° C., 400 g. of isopropanol are run in, the batch is cooled to room temperature and suctioned. The crystals are washed with 3 × 400 g. of isopropanol and dried at 80 to 90° C. in a vacuum drying cabinet.

Yield of di-benzoxazolyl-thiophene, melting at 221° C.: 90.7% of the theoretical.

EXAMPLE 13

2,5-di-[5′,6′-dimethylbenzoxazolyl-(2′)]-furan

A mixture of 7.8 g. of furan-2,5-dicarboxylic acid, 13.6 g. of 2-amino-4,5-dimethylphenol, 8.4 ml. of pyridine, 0.25 g. of boric acid and 100 ml. of a mixture consisting of 73% of diphenyl ether and 27% of diphenyl is stirred with exclusive of air and heated within 2½ hours to 180° C. Pyridine+water passes over and a thick, light brown suspension of the amide of the formula (4)
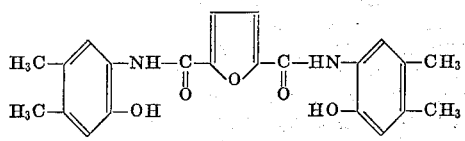

forms. 0.5 grams of boric anhydride is added, and the batch is heated within 2 hours to 240° C. and stirred for another hour at 240–245° C., during which the reaction mixture dissolves and water is eliminated. The batch is allowed to cool and the crystals formed are suctioned off, washed with dimethylformamide and alcohol and dried, to furnish 15.1 g. (=85% of theory) of the crude compound of the formula (5)
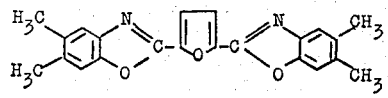

in form of a grey-brown crystalline powder melting at 252–255° C. Recrystallization from trichlorobenzene with the aid of bleaching earth furnishes light yellow crystals melting at 253–255° C.

EXAMPLE 14

When terephthalic acid or diphenyl-4,4′-dicarboxylic acid and respectively, 3-hydroxy-4-aminodiphenyl, is reacted as described in Example 13 but at a final temperature of 260° C., there are obtained the compounds of the formulae (6)
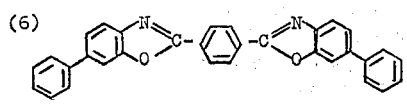

in a yield of 69% in light yellow crystals from trichlorobenzene, melting at 345–347° C. and, respectively.

(7)
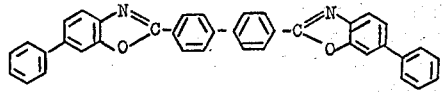

in a yield of 79% in form of light yellow crystals from trichlorobenzene, melting at 343–345° C.

EXAMPLE 15

1,2-di-[benzoxazolyl-(2′)]-ethane

A mixture of 219 g. of 2-aminophenol, 118 g. of succinic acid, 5 g. of boric acid, 500 g. of trichlorobenzene and 158 g. of pyridine is stirred with exclusion of air and heated within 4 hours to 210° C. The temperature is raised to 220° C. within a further hour and the batch is stirred for 3 hours at 220° C. 400 grams of isopropanol are cautiously run into the clear brown solution and the whole is cooled to room temperature, suctioned, washed with isopropanol and dried in a vacuum drying cabinet.

Yield: 97.8% of 1,2-[benzoxazolyl-(2′)]-ethane in crystals melting at 191–191.7° C.

EXAMPLE 16

1,4-di[benzoxazolyl-(2′)]-butane

A mixture of 219 g. of 2-aminophenol, 146 g. of adipic acid, 5 g. of boric acid, 400 g. of trichlorobenzene and 158 g. of pyridine is heated with exclusion of air within 4 hours to 210° C., then within a further hour to 220° C.

and stirred for 4 hours at 220° C. 400 grams of isopropanol are run in at 150° C.; the whole is cooled to room temperature, suctioned, washed and dried.

The yield of 1,4-di-[benzoxazolyl-(2′)]-butane, melting at 130–130.5° C., amounts to 88.5% of the theoretical.

EXAMPLE 17

1,2-di-[5′-methyl-benzoxazolyl)-(2′)]-ethylene

A mixture of 246 g. of 2-amino-4-methylphenol, 148 g. of malic acid, 6 g. of boric acid, 1 kg. of xylene and 158 g. of pyridine is stirred with exclusion of air under nitrogen and within 2 hours heated to 130° C. during which the reaction mixture temporarily becomes difficult to stir.

The temperature is raised to 140° C. within 3 hours and then within another 5 hours to 144° C. The pyridine +water mixture is separated from the azeotrope passing over, whereas the xylene is returned to the reaction mixture. On completion of the reaction the batch is concentrated and finally the xylene completely removed by steam distillation.

The yellow crystals are suctioned off and rinsed with isopropanol.

Yield, after drying: 236.5 g. of 1,2-di-[5′ - methyl-benzoxazolyl-(2′)]-ethylene, corresponding to 69.5% of the theoretical. Melting point: 190° C.

What is claimed is:

1. A process for the manufacture of aryloxazoles starting from ortho-hydroxyaminoaryl compounds and carboxylic acids in the preesnce of a diluent characterized in that (1)

(a) an aliphatic dicarboxylic acid selected from the group consisting of adipic, dichlorosuccinic, tartaric, aspartic, thiomalic, succinic, fumaric and malic acid or a carboxylic acid, containing 1 or 2 carboxyl groups, of benzene, diphenyl, naphthalene, stilbene, styrene, thiophene or furan, or said carboxylic acids containing 1 to 3 alkyl groups with 1 to 4 carbon atoms each, is reacted with (b) a saturated tertiary nitrogen base from the group of dimethylaniline and diethylaniline, pyridine, picoline and quinoline or from trimethylamine or triethylamine in the presence of (c) a diluent, which may be the nitrogen base defined aboxe or a halobenzene, xylene, tetrahydronaphthalene, diphenyl ether or diphenyl or a mixture thereof, which boils at 200° C. or over and is liquid at room temperature, then (2)

(a) this reaction mixture, together with an approximately equivalent quantity, referred to the carboxyl groups, of an ortho-hydroxyaminobenzene which may be substituted by 1 to 3 alkyl groups containing 1 to 4 carbon atoms, or by a phenyl group, and (b) a catalytic amount of boric acid, is heated to 150 to 210° C., and (3)

the reaction is finalized by heating to a temperature of 200 to 260° C.

2. A process according to claim 1, characterized in that (1)

(a) a dicarboxylic acid of benzene, diphenyl, naphthalene, stilbene, thiophene or furan and
(b) 0.1 to 1 mol equivalent of pyridine for every carboxylic acid equivalent are reacted in
(c) trichlorobenzene as diluent and (2)

this reaction mixture, together with
(a) approximately the equivalent quantity of an ortho-hydroxy-aminobenzene, which may be substituted by an alkyl group with 1–4 carbon atoms, and
(b) 0.5 to 10% by weight of boric acid, is heated to 150–210° C. and (3)

the reaction is finalized by heating to 200 to 240° C.

3. A process according to claim 1, characterized in that a mixture, prepared by combining a tertiary nitrogen base with a carboxylic acid of the indicated composition and a hydroxyaminoaryl compound of the indicated composition in a liquid diluent, is first heated to a temperature of 150 to 210° C. until for every molecule of hydroxyaminoaryl compound about 1 mol of water has been eliminated, and the reaction is then finalized by heating to a higher temperature but not exceeding 240° C., during which the water is continuously distilled off.

4. A process according to claim 1, characterized in that the tertiary nitrogen base used is a pyridine base.

5. A process according to claim 1, characterized in that the aliphatic dicarboxylic acid is succinic or fumaric or preferably malic acid.

6. A process according to claim 1, characterized in that the hydroxyamino aryl compound used is an ortho-hydroxyamino benzene of the formula

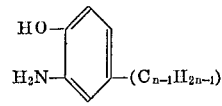

in which $n$ is a digit from 1 to 5.

References Cited

UNITED STATES PATENTS 3,136,773  6/1964  Maeder et al. _____ 260—307

ALEX MAZEL, Primary Examiner

R. V. RUSH, Assistant Examiner

U.S. Cl. X.R.

260—240 CA, 240 D